(12) United States Patent
Chen et al.

(10) Patent No.: US 12,081,086 B2
(45) Date of Patent: Sep. 3, 2024

(54) EXTERNALLY EXCITED ELECTRIC MACHINE

(71) Applicant: Mahle International GmbH, Stuttgart (DE)

(72) Inventors: Guanqun Chen, Sersheim (DE); Stefan Kanz, Burladingen (DE); Penyo Topalov, Stuttgart (DE); Florian Osdoba, Stuttgart (DE)

(73) Assignee: Mahle International GmbH (DE)

( * ) Notice: Subject to any disclaimer, the term of this patent is extended or adjusted under 35 U.S.C. 154(b) by 428 days.

(21) Appl. No.: 17/558,578

(22) Filed: Dec. 21, 2021

(65) Prior Publication Data
US 2022/0200425 A1  Jun. 23, 2022

(30) Foreign Application Priority Data

Dec. 22, 2020 (DE) ............... 10 2020 216 487.8
Sep. 24, 2021 (DE) ............... 10 2021 210 710.9

(51) Int. Cl.
*H02K 19/12* (2006.01)
*H02K 7/00* (2006.01)
*H02K 7/116* (2006.01)

(52) U.S. Cl.
CPC ............ *H02K 19/12* (2013.01); *H02K 7/003* (2013.01); *H02K 7/116* (2013.01)

(58) Field of Classification Search
CPC ......... H02K 19/12; H02K 7/003; H02K 7/116
See application file for complete search history.

(56) References Cited

U.S. PATENT DOCUMENTS

| 6,844,639 | B2 | 1/2005 | Lacaze |
| 6,995,485 | B2 | 2/2006 | Sezgin et al. |
| 2005/0218740 | A1 | 10/2005 | Stout |

(Continued)

FOREIGN PATENT DOCUMENTS

| CH | 705 833 B1 | 6/2013 |
| CN | 1610221 A | 4/2005 |

(Continued)

OTHER PUBLICATIONS

German Search report dated Aug. 17, 2022 for copending German App. No. DE102021210710.9 (w_machine_Eng_translation).

(Continued)

*Primary Examiner* — Tulsidas C Patel
*Assistant Examiner* — Mohammed Ahmed Qureshi
(74) *Attorney, Agent, or Firm* — Fishman Stewart PLLC

(57) ABSTRACT

An externally excited electric machine may comprise a stator, a rotor, a primary winding, a secondary winding, and electronics. The rotor may be arranged coaxially to and/or in the stator. The rotor may be rotatable relative to the stator about a rotation axis running in an axial direction. The rotor may have a magnetizable hollow-cylindrical core. The primary winding may be guided axially through the core. An electric primary current may flow through the primary winding. The secondary winding may be wound around the core so that an electric secondary current is induced via the primary winding in the secondary winding. The electronic may be connect to the secondary winding for tapping the secondary current.

20 Claims, 2 Drawing Sheets

(56) References Cited

U.S. PATENT DOCUMENTS

| | | | |
|---|---|---|---|
| 2011/0241465 A1* | 10/2011 | Anghel | ............... H02K 7/006 |
| | | | 310/114 |
| 2015/0054373 A1 | 2/2015 | Mane | |
| 2020/0313533 A1 | 10/2020 | Ridge | |
| 2021/0408875 A1 | 12/2021 | Maier | |
| 2022/0060088 A1* | 2/2022 | Maier | ................ H02K 9/00 |

FOREIGN PATENT DOCUMENTS

| | | | |
|---|---|---|---|
| CN | 109905004 A | 6/2019 | |
| DE | 101 07 577 A1 | 9/2002 | |
| DE | 102020207000 A1 | 12/2020 | |
| DE | 102020107426 A1 | 9/2021 | |
| EP | 1443639 A1 | 8/2004 | |
| EP | 2372880 A2 | 10/2011 | |
| EP | 3026796 A1 | 6/2016 | |
| GB | 239571 A | 9/1925 | |
| JP | H09238454 A | 9/1997 | |
| KR | 20080018376 A | 2/2008 | |
| KR | 20180088555 A | 8/2018 | |
| WO | 02067276 A1 | 8/2002 | |
| WO | 2013114286 A2 | 8/2013 | |

OTHER PUBLICATIONS

English abstract for CH-101 07 577.
Chinese First Office Action dated Jan. 29, 2024 and Chinese Search Report dated Jan. 26, 2024 for Chinese Patent Application No. 2021111765685.

\* cited by examiner

EXTERNALLY EXCITED ELECTRIC MACHINE

CROSS-REFERENCE TO RELATED APPLICATIONS

This application claims priority to German Application No. DE102020216487.8 filed on Dec. 22, 2020 and DE102021210710.9, filed on Sep. 24, 2021, the contents of which are hereby incorporated by reference in their entirety.

TECHNICAL FIELD

The present invention relates to an externally excited electric machine, in particular a synchronous motor, which has a stator and a rotor and a magnetizable core. The invention further relates to the use of such an electric machine in a motor vehicle and a motor vehicle with such an electric machine.

BACKGROUND

The use of externally excited electric machines, in particular externally excited electric synchronous machines, such as for example externally excited synchronous motors, in various applications, for example in motor vehicles, is known. Such machines have a stator and a rotor arranged coaxially to the stator, which is rotatable relative to the stator about a rotation axis. In operation of the electric machine, the rotor rotates about the rotation axis. In externally excited electric machines, the transmission of an electric current to the rotor is provided, in order to electrically supply the rotor, in particular coils mounted on the rotor.

It is known to use slip rings for this purpose. Here, in operation and therefore during the rotation of the rotor, at least one brush rubs on an associated slip ring and in this way guarantees the transmission of the required electric current. A disadvantage in such electric machines is the wear which is caused by the rubbing of the brush on the slip ring. In addition, dust occurs in operation in this way, which can lead to breakdowns in operation of the electric machine or can at least restrict the operation. In particular, for this reason, the possibilities for operating the electric machine at high rotation rates is limited.

In order to circumvent the problem of the slip ring, it is known from the prior art, for example from CH 705 833 B 1, to transmit the required electric current to the rotor via a rotating transformer. For this, respectively associated windings and transformer cores are mounted on the stator and on the rotor. This leads to a complex structure of the externally excited electric machine.

From DE 101 07 577 A1 an externally excited electric machine with a rotating transformer is known. In this electric machine, the core mounted on the stator, together with associated winding, and the core mounted on the rotor, together with associated winding, are arranged lying axially opposite. This leads to a complex structure of the externally excited electric machine.

The cores of the transformers are expediently magnetizable. Owing to their advantageous magnetizations, ferrites in particular come into use here. Ferrites are ferrimagnetic and have very low electric conductivities. However, ferrites are usually also ceramic materials and thus have mechanical characteristics which lead to a limiting of the possible rotation rates of the associated electric machine.

The present invention is therefore concerned with the problem of indicating, for an externally excited electric machine of the type named in the introduction and for a motor vehicle with such an electric machine, improved or at least other embodiments, which is distinguished in particular by increased possible rotation rates and/or a simplified structure.

This problem is solved according to the invention by the subjects of the independent claims. Advantageous embodiments are the subject of the dependent claims.

SUMMARY

The present invention is based on the general idea, in an externally excited electric machine, in particular in an externally excited electric synchronous machine, for the contactless transmission of an electric current to a rotor of the electric machine, to use the principle of a current converter instead of the rotating transformers used in the prior art. In so doing, the rotor is arranged within the stator and is connected to a magnetizable core. The core is thus arranged within the rotor. The magnetizable core is thus limited in this way in its radial extent, therefore having a reduced diameter. This leads, in operation, to reduced centrifugal forces acting on the core. Consequently, damage to the core is prevented or at least reduced. The core, and consequently the rotor, can thus be operated at increased rotation rates. The rotation rate of the electric machine corresponds here to a rotation speed of the rotor about a rotation axis.

In accordance with the idea of the invention, the externally excited electric machine, in particular synchronous machine, has the rotor and a stator. The rotor and the stator are arranged coaxially to one another. The rotor is rotatable relative to the stator about the rotation axis, which runs in an axial direction. The rotor is arranged radially on the inner side of the stator and is thus arranged in the stator. According to the invention, the rotor has a hollow-cylindrical core which is magnetizable and hollow-cylindrical. According to the invention, a primary winding of the electric machine is guided axially through the hollow-cylindrical core. In operation, the primary winding is flowed through by an electric current which is also designated below as primary current. The electric machine has, furthermore, a secondary winding, which is wound around the core. The winding of the secondary winding around the core is such that in the secondary winding, in operation, an electric current is induced via the primary winding and thus via the primary current, which electric current is also designated below as secondary current. The electric machine has, furthermore, electronics by which the secondary current is tapped. For this purpose, the electronics are connected to the secondary winding in a corresponding manner.

The electric machine concerns in particular an externally excited, so-called brushless, electric machine, preferably a synchronous machine. The electric machine preferably concerns an externally excited synchronous motor.

The primary winding is expediently spaced apart from the secondary winding. The primary winding is, furthermore, expediently spaced apart from the core.

The primary winding, guided axially through the core, runs at least in the portion which is guided axially through the core. In particular, the primary winding is flowed through axially in this portion in operation.

The directions which are indicated here refer to the axial direction and thus to the rotation axis of the rotor. Accordingly, run radially or respectively the radial direction transversely to the axial direction. The circumferential direction runs around the axial direction or respectively the axial direction in an encircling manner.

In operation, the components of the rotor rotate jointly about the rotation axis. This means that, in operation, the core and the secondary winding rotate about the rotation axis.

In contrast, it is preferred if the primary winding is non-rotatable relative to the stator, therefore does not rotate with the rotor. This leads to a simplified structure and to a more stable magnetic field, in particular magnetic flux in the core. For the non-rotatable arrangement of the primary winding, it is conceivable to mount, in particular fix, the primary winding on the rotor.

In so doing, the electric machine can come into use in any desired applications. The use of the electric machine in a motor vehicle is to be considered in particular. Here, the electric machine, in particular the synchronous motor, can serve for the drive of the motor vehicle and/or for the adjusting of adjustment elements of the motor vehicle.

It is to be understood here that the corresponding applications of the electric machine and a motor vehicle with the electric machine respectively likewise belong to the scope of this invention.

The electronics of the electric machine serve for the electrical supply, in particular control, of components of the electric machine which are mounted on the rotor. In particular, the electronics supply, via the secondary current, at least one coil which is mounted on the rotor.

Embodiments are preferred, in which the rotor has, radially in the interior, a hollow shaft through which the primary winding is axially guided. The core is therefore arranged separately from the hollow shaft and radially externally with respect to the hollow shaft and is non-rotatable with the hollow shaft. In so doing, the rotor is advantageously rotatably mounted via the hollow shaft about the rotation axis. The core can thus be configured in a more simple manner. Furthermore, this leads to a reduction of the radial extent of the core and consequently to less core material in radial direction. As a result, the rotor, in particular the core, is mechanically stable also at increased rotation speeds and can thus be operated at increased rotation rates. The omission of a direct bearing of the core also leads to a simplified configuration of the core and to a reduced mechanical load of the core, so that the electric machine, again, can be operated at increased rotation rates.

The non-rotatable connection of the core with the hollow shaft can basically be configured in any desired manner. Advantageously, the core is connected directly in a non-rotatable manner to the hollow shaft radially externally with respect to the hollow shaft. In particular, the core is fixed on the hollow shaft radially internally with the respect to the core radially externally with respect to the hollow shaft. This follows for example through a fit, force-fitting and/or form-fitting connection.

In preferred embodiments, the rotor has a hollow-cylindrical rotation body radially externally with respect to the core. The rotation body is therefore separate from the core and is connected to the core in a non-rotatable manner. In this way, the core is mechanically stabilized radially with respect to the exterior, so that the rotor as a whole can be operated at increased rotation speeds.

The non-rotatable connection of the core to the rotation body can basically be configured in any desired manner. Advantageously, the core is connected to the rotation body directly in a non-rotatable manner, radially internally with respect to the rotation body. In particular, the core is fixed to the rotation body radially externally with respect to the core, radially internally with respect to the rotation body. This follows for example through a fit, force-fitting and/or form-fitting connection.

It is particularly preferred if the rotor has both the hollow shaft and also the rotation body. The core is thus arranged radially between the rotation body and the hollow shaft. This leads to a distinct mechanical stabilizing of the core, so that increased rotation speeds of the rotor and thus increased rotation rates of the electric machine are possible.

Embodiments prove to be advantageous in which the hollow shaft and the rotation body act upon the core mechanically. The core is thus mechanically stabilized radially and pre-stressed. This leads to a reduction of the effects on the core, caused by occurring centrifugal forces, in operation. Consequently, the rotor can be operated at increased rotation speeds.

The core concerns in particular a ferrimagnetic core. In particular, the core is a ferrite. It is particularly preferred if the core is softly ferrimagnetic. The core can therefore concern in particular a soft magnetic ferrite. The core can thus be magnetized in a particularly simple manner and the secondary current can thus be induced in a simplified manner. This leads to a more efficient operation of the electric machine.

The core can be produced for example from EPCOS N27, Vitroperm®, Vitrovac® and suchlike.

The core has weaker mechanical characteristics, in particular a lower compressive strength and/or tensile strength compared to the hollow shaft and/or to the rotation body.

The hollow shaft can be produced from a metal or from a metal alloy, for example also aluminium or from steel.

The secondary winding can basically be wound around the core in any desired manner, in so far as in the secondary winding the secondary current is induced with the primary current.

Advantageously, the secondary winding runs transversely to the circumferential direction of the core. This means, in particular, that the secondary winding runs around radial and axial outer sides of the core. This enables an increased efficiency during inducing of the secondary current and consequently leads to an increased efficiency of the electric machines.

The winding number of the primary winding and of the secondary winding can basically be as desired. Here, an alteration of the winding number of the secondary winding and/or of the primary winding permits an adaptation of the relationship between primary current and secondary current.

It is preferred if the winding number of the primary winding is one. This leads to a simplified structure of the electric machine.

It is advantageous if the winding number of the secondary winding is one. Owing to the inversely proportional dependence of the secondary current on the winding number of the secondary winding, the secondary current can thus be induced with an increased current intensity.

The electric machine advantageously has an output shaft, which can protrude from the electric machine. When the electric machine is configured as a motor, a torque is tapped by means of the output shaft. In so doing, the output shaft is drivingly connected to the rotor. Basically, for this purpose, the output shaft can be connected directly non-rotatably to the rotor. In particular, the output shaft can correspond to the rotor.

The rotation shaft is preferably spaced apart radially with respect to the rotor and is drivingly connected to the rotor via a gearing. The rotation of the rotor is therefore transmitted to the output shaft via the gearing.

It is preferred if the hollow shaft projects axially over the core with a portion which is also designated below as drive portion. Here, the output shaft is spaced apart radially with respect to the hollow shaft and is mechanically connected to the hollow shaft via the gearing, so that the hollow shaft is drivingly connected to the output shaft. This leads to a compact structure of the electric machine and a simplified bearing of the rotor, in particular of the hollow shaft.

The electronics can basically be arranged in any desired manner. Embodiments are preferred in which the electronics are spaced apart axially with respect to the core. Here the hollow shaft, in particular with the drive portion, can be guided axially through the electronics.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained more closely in the following description, wherein the same reference numbers refer to identical or similar or functionally identical components.

There are shown, respectively diagrammatically:

DETAILED DESCRIPTION

Figure 1:
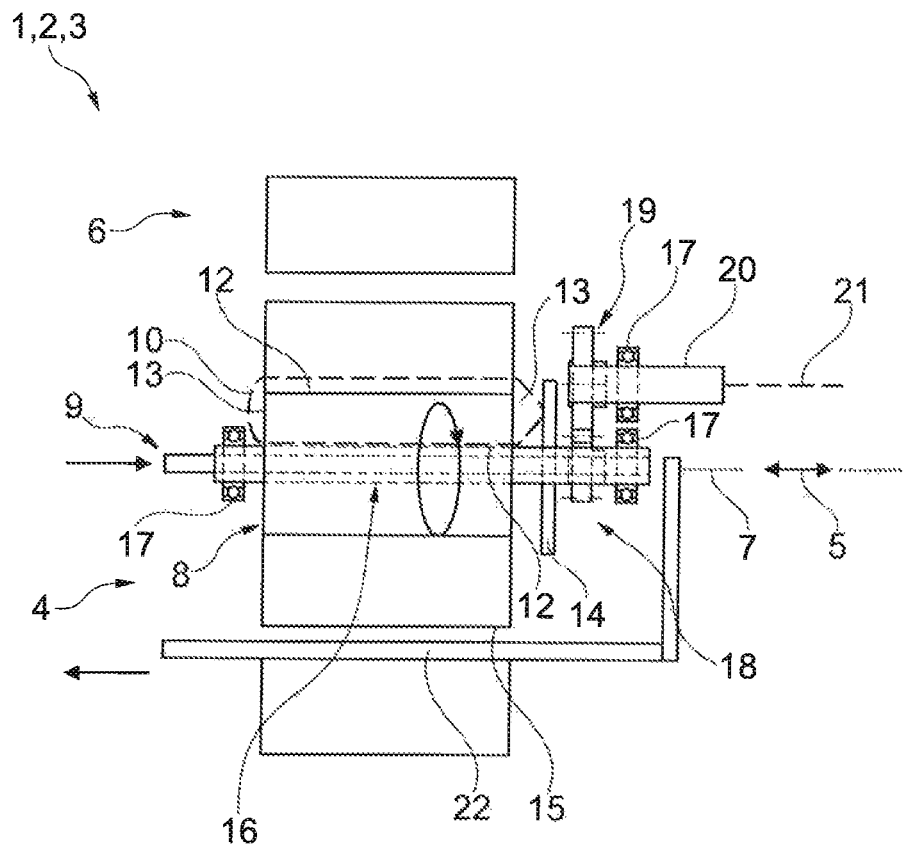
FIG. 1 a section through an externally excited electric machine.
Figure 2:
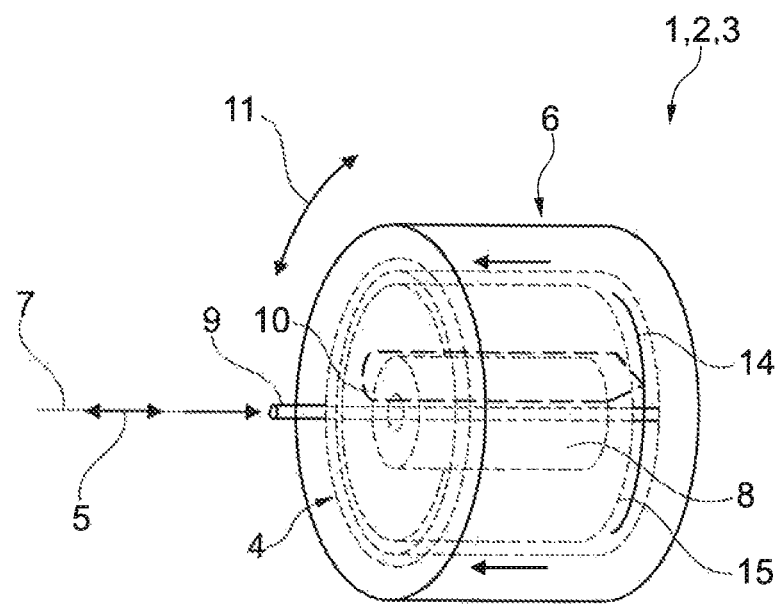
FIG. 2 an isometric, partially transparent view of the electric machine in another example embodiment, FIG. 3 a highly simplified illustration of a motor vehicle with the electric machine.
Figure 3:
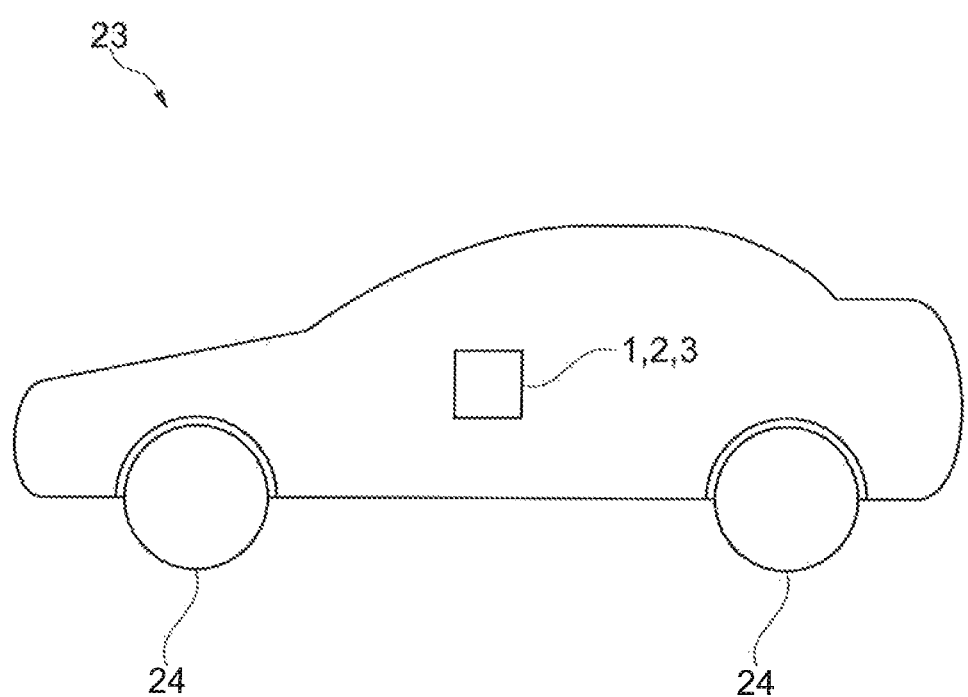

An externally excited electric machine 1, as is to be seen in FIGS. 1 to 3, is configured in particular as an externally excited electric synchronous machine 2, preferably as an externally excited electric synchronous motor 3. The electric machine 1 has a rotor 4, which extends in an axial direction 5 and is rotatable relative to a stator 6 of the electric machine 1 about a rotation axis 7 running in axial direction 5. The rotor 4 is arranged here radially internally with respect to the stator 6. The stator 6 is spaced apart radially with respect to the rotor 4.

The rotor 4 has a hollow-cylindrical core 8 which is magnetizable. The core 8 is preferably a ferrite, particularly preferably a soft magnetic ferrite. The electric machine 1 has a primary winding 9 which is guided axially through the hollow-cylindrical core 8. The winding number of the primary winding 9 is one in the examples which are shown. The primary winding 9 runs here axially at least in the portion which is guided through the core 8.

The electric machine 1 has, furthermore, a secondary winding 10, which is indicated by a dashed line in FIGS. 1 and 2. The secondary winding 10 is wound around the core 8. Here, the secondary winding 10 in the example embodiments which are shown is wound transversely to a circumferential direction 11 of the core 8. The secondary winding 10 is therefore wound around radial outer sides 12 and axial outer sides 13 of the core 8. In the example embodiments which are shown, a winding number of the secondary winding 10 is one.

The directions which are indicated here refer to the axial direction 5 and thus to the rotation axis 7 of the rotor 4. Accordingly, run radially or respectively the radial direction transversely to the axis direction 5. The circumferential direction 11 runs about the axial direction 5 or respectively in a circulating manner with respect to the axial direction 5.

In operation, the primary winding 9 is flowed through by a primary current. A secondary current is thus induced via the core 8 in the secondary winding 10. This secondary current is fed to electronics 14 of the electric machine 1, in particular of the rotor 4. In the example embodiments shown in FIGS. 1 and 2, this takes place through an electric connection of end faces of the secondary winding 10 with the electronics 14. The electronics 14 can electrically supply and control coils of the rotor 4, which are not shown, with the fed secondary current, in order for example to generate a constantly magnetic field of the rotor 4.

As can be seen in particular from FIG. 1, the primary winding 9 is non-rotatable with respect to the stator 6. The primary winding 9 therefore does not rotate with the rotor 4. For this purpose, the primary winding 9 is fixed to the stator 6 outside the rotor 4. In contrast, the core 8 and the secondary winding 10 rotate with the rotor 4.

In the example embodiments which are shown, the rotor 4 has a rotation body 15, which is arranged on the core 8 radially externally with respect to the core 8 and is connected non-rotatably with the core 8. Thus the core 8 is stabilized radially with respect to the exterior by the rotation body 15. In this way, the electric machine 1 can be operated at increased rotation rates, the rotor 4 therefore at increased rotation speeds. The rotation body 15 advantageously lies radially externally in a flat manner against the core 8 and is non-rotatably connected to the core 8, for example by a fit.

In the example embodiment of FIG. 1, the rotor 4 has, furthermore, a hollow shaft 16, which is arranged on the core 8 radially internally with respect to the core 8. The core 8 is therefore arranged radially between the hollow shaft 16 and the rotation body 15. The core 8 is thus stabilized radially on both sides and can thus be operated at increased rotation speeds, so that the electric machine 1 can be operated as a whole at increased rotation rates. The hollow shaft 16 preferably lies radially internally with respect to the core 8 in a flat manner against the core 8 and is connected non-rotatably to the core 8, for example by a fit. The core 8 is preferably acted upon radially mechanically by the hollow shaft 16 and the rotation body 15.

In the example embodiment shown in FIG. 1, the hollow shaft 16 projects axially from the core 8 on both sides, projects axially on both sides over both the core 8 and also the rotation body 16. Here, the rotor 4 is rotatably mounted by means of bearings 17 via the hollow shaft 16 about the rotation axis 7. In the example embodiment shown in FIG. 1, the hollow shaft 16 is guided in addition axially through the electronics 14.

The hollow shaft 16 of the example embodiment shown in FIG. 1 has an axially protruding output portion 18, which is drivingly connected with an outlet shaft 20 of the electric machine 1 via a gearing 19. Here, the output shaft 20 is arranged in an offset manner radially with respect to the hollow shaft 16 and is rotatably mounted via at least one bearing 17 about an axis of rotation 21 which is parallel to the rotation axis 7 and spaced apart radially thereto.

As can be seen in particular from FIG. 1, the primary winding 19 is guided through the entire rotor 4 and projects axially on both sides out from the rotor 4. Here, the primary winding 9 is mounted on the stator with a connection portion 22 radially internally with respect to the stator 6. As can be seen in particular from FIG. 1, the secondary winding 10 is wound here around the core 8 in the remote region of the core 8 radially from the connection portion 22 of the primary winding 9. This leads to a reduction of undesired inductions and/or eddy currents in the secondary winding 10 and thus to an improved indexing of the secondary current in the secondary winding 10.

In the examples which are shown, the electronics 14 is spaced apart axially with respect to the core 8 and axially with respect to the rotation body 15.

The rotor 4 and the stator 6 are arranged in a housing, which is not shown, of the electric machine 1. Here, the bearings 17 and the stator 6 are fixed non-rotatably relative to the housing, in particular on the housing.

As can be seen from FIG. 3, the electric machine 1, in particular the synchronous motor 3, comes into use for example in a motor vehicle 23. In the motor vehicle 23, the electric machine 1 can serve for the drive of the motor vehicle 23. For this purpose, the electric machine 1, in particular the rotor 4, is connected mechanically in a suitable manner with at least one wheel 24 of the motor vehicle 23.

The invention claimed is:

1. An externally excited electric machine, comprising:
a stator;
a rotor arranged coaxially to and/or in the stator, the rotor is rotatable relative to the stator about a rotation axis running in an axial direction, and the rotor has a magnetizable hollow-cylindrical core;
a primary winding guided axially through the core, an electric primary current flows through the primary winding;
a secondary winding wound around the core so that an electric secondary current is induced via the primary winding in the secondary winding; and
electronics connected to the secondary winding for tapping the secondary current.

2. The electric machine according to claim 1, wherein the rotor has, radially internally, a hollow shaft through which the primary winding is guided axially, the hollow shaft is rotatably mounted about the rotation axis.

3. The electric machine according to claim 1, wherein the rotor has, radially externally with respect to the core, a hollow-cylindrical rotation body.

4. The electric machine according to claim 3, wherein the hollow shaft and the rotation body act upon the core radially.

5. The electric machine according to claim 1, wherein the secondary winding is wound around the core transversely to a circumferential direction of the core running around the axial direction.

6. The electric machine according to claim 1, wherein the primary winding is non-rotatable with respect to the stator.

7. The electric machine according to claim 1, wherein the core is softly ferrimagnetic.

8. The electric machine according to claim 1, wherein a winding number of the primary winding is one.

9. The electric machine according to claim 1, wherein a winding number of the secondary winding is one.

10. The electric machine according to claim 2, wherein the hollow shaft projects axially over the core with a drive portion, the electric machine has an output shaft which protrudes out of the electric machine, the output shaft is spaced apart radially with respect to the hollow shaft, a gearing mechanically connects the drive portion of the hollow shaft to the output shaft.

11. A method of operating an electric machine according to claim 1 for driving a motor vehicle.

12. A method of operating an electric machine according to claim 1 for adjusting an adjustment element in a motor vehicle.

13. A motor vehicle comprising an electric machine according to claim 1 for driving the motor vehicle and/or for adjusting an adjustment element of the motor vehicle.

14. The electric machine according to claim 1, wherein a winding number of the primary winding is one, and a winding number of the secondary winding is one.

15. An electric machine, comprising:
a stator;
a rotor arranged coaxially to the stator, the rotor is rotatable relative to the stator about a rotation axis running in an axial direction, and the rotor has a magnetizable hollow-cylindrical core;
a primary winding guided axially through the core, an electric primary current flows through the primary winding;
a secondary winding is wound around the core so that an electric secondary current is induced via the primary winding in the secondary winding; and
electronics connected to the secondary winding for tapping the secondary current;
wherein the rotor has, radially internally, a hollow shaft through which the primary winding is guided axially, the hollow shaft is rotatably mounted about the rotation axis; and
wherein the hollow shaft projects axially over the core with a drive portion, the electric machine has an output shaft which protrudes out of the electric machine, the output shaft is spaced apart radially with respect to the hollow shaft, a gearing mechanically connects the drive portion of the hollow shaft to the output shaft.

16. The electric machine according to claim 15, wherein the rotor has, radially externally with respect to the core, a hollow-cylindrical rotation body.

17. The electric machine according to claim 16, wherein the hollow shaft and the rotation body act upon the core radially.

18. The electric machine according to claim 15, wherein the secondary winding is wound around the core transversely to a circumferential direction of the core running around the axial direction.

19. The electric machine according to claim 15, wherein the primary winding is non-rotatable with respect to the stator.

20. The electric machine according to claim 15, wherein the core is softly ferrimagnetic.

* * * * *